United States Patent [19]
Maeda

[11] Patent Number: 5,918,950
[45] Date of Patent: Jul. 6, 1999

[54] HYDRAULIC ANTI-SKID BRAKING SYSTEM FOR A VEHICLE

[76] Inventor: Hiroyuki Maeda, 49-7-608, Naritahigashi 1-chome, Suginami-ku, Tokyo 166, Japan

[21] Appl. No.: 08/928,353

[22] Filed: Sep. 12, 1997

Related U.S. Application Data

[63] Continuation of application No. 08/591,029, Jan. 25, 1996, abandoned.

[30] Foreign Application Priority Data

Feb. 8, 1995 [JP] Japan .................................. 7-043396

[51] Int. Cl.⁶ ........................................................ B60T 8/32
[52] U.S. Cl. ........................ 303/116.2; 303/900; 303/901
[58] Field of Search ............................. 303/116.1, 116.2, 303/900, 901; 188/71.6

[56] References Cited

U.S. PATENT DOCUMENTS

| | | |
|---|---|---|
| 2,821,273 | 1/1958 | Sanford et al. . |
| 2,879,867 | 3/1959 | Rike . |
| 3,420,342 | 1/1969 | Botterill . |
| 4,014,410 | 3/1977 | Bryant . |
| 4,415,070 | 11/1983 | Pickering et al. . |
| 4,557,363 | 12/1985 | Golan . |
| 4,706,459 | 11/1987 | Burckhardt . |
| 4,799,575 | 1/1989 | Kroniger ................................. 188/61.6 |
| 4,893,879 | 1/1990 | Middelhoven et al. . |
| 5,397,174 | 3/1995 | Willmann .............................. 303/116.2 |
| 5,445,242 | 8/1995 | Pogorzelski et al. . |

FOREIGN PATENT DOCUMENTS

| | | |
|---|---|---|
| 1 954 733 | 5/1971 | Germany . |
| 1 680 016 | 8/1971 | Germany . |
| 33 36 114 A1 | 5/1985 | Germany . |
| 4139136 | 6/1993 | Germany ............................ 303/116.2 |
| 42 30 889 A1 | 3/1994 | Germany . |
| 5131908 | 5/1993 | Japan ................................... 303/116.2 |
| 530 151 | 12/1940 | United Kingdom . |
| 2 079 393 | 1/1982 | United Kingdom . |
| WO 90/10565 | of 0000 | WIPO . |
| WO 83/04432 | 12/1983 | WIPO . |

*Primary Examiner*—Matthew C. Graham
*Attorney, Agent, or Firm*—Flynn, Thiel, Boutell & Tanis, P.C.

[57] ABSTRACT

First and second directional control valves are respectively structured by directional control valves which are operable when skids occur in a wheel and are switchable to only a communication position or to an interrupting position, which enhances switching speed and anti-skid control speed. One end of a main fluid passage is coupled to a wheel cylinder by way of a second directional control valve which is switchable to a communication position or to an interrupting position, and is normally positioned at the communication position. One end of a pressure reduction fluid passage is coupled to the wheel cylinder by way of a first directional control valve which is switchable to a communication position or to an interrupting position, and is normally positioned at the interrupting position. The other end of the main fluid passage is coupled to the fluid pressure generating unit and the other end of the pressure reduction fluid passage is coupled to the main fluid passage detouring around the second directional control valve. A first accumulator, a fluid pressure pump and a second accumulator are provided on the pressure reduction fluid passage wherein the first accumulator can be reduced by operating the fluid pressure pump.

14 Claims, 1 Drawing Sheet

HYDRAULIC ANTI-SKID BRAKING SYSTEM FOR A VEHICLE

This application is a continuation of U.S. Ser No. 08/591 029, filed Jan. 25, 1996, abandoned.

BACKGROUND OF THE INVENTION

1. Field of the invention

The present invention relates to an anti-skid (lock) control unit for vehicles.

2. Prior Art

There is known a prior art anti-skid control unit in which a single brake fluid passage is coupled to a wheel cylinder through which operation fluid (brake fluid) is supplied or discharged. Whereupon, in such a wheel cylinder, not only a braking operation or releasing operation of a brake unit is performed by depressing or releasing the brake pedal using the single brake fluid passage but also an operation involved in an anti-skid control is performed, namely, each operation for increasing, keeping or reducing fluid pressure is performed by using single brake fluid passage. Accordingly, a directional control valve is interposed on the brake fluid passage so as to be switched to a pressure increasing position, pressure keeping position, or a pressure reducing position.

However, since the directional control valve comprising an electromagnetic valve is needed to be controlled so as to be switched to the aforementioned three positions in the prior art anti-skid control unit, there arise problems in that the structure is complex and the control operation is delayed. For example, when the directional control valve is switched from the pressure increasing position to the pressure reducing position, the brake fluid passage is allowed to pass through the pressure keeping position, which takes time.

SUMMARY OF THE INVENTION

The present invention has been made to solve the aforementioned problems and comprises as follows.

It is a first aspect of the invention to provide an anti-skid control unit for vehicles comprising a wheel cylinder 3 of a braking element, a fluid pressure generating unit 1 for generating fluid pressure depending on amount of depression of a brake pedal 32, a main fluid passage (4, 5 and 6) having one end coupled to the wheel cylinder 3, and the other end coupled to the fluid pressure generating unit 1, a second directional control valve 8 provided in the main fluid passage (4, 5 and 6), the second directional control valve 8 being switchable to a communication position a or to an interrupting position b, but is normally switched to the communication position a, a pressure reduction fluid passage 9 having one end coupled to the wheel cylinder 3 and the other end coupled to the main fluid passage (4, 5 and 6) bypassing around the second directional control valve 8, a first directional control valve 38 provided in the pressure reduction fluid passage 9, the first directional control valve 38 being switchable to a communication position f or to an interrupting position g, but normally switched to the interrupting position g, a first accumulator 13, a fluid pressure pump 10 and a second accumulator 14 respectively positioned at the other end side of the first directional control valve 38 of the pressure reduction fluid passage 9 and being successively disposed in this order from the first directional control valve 38; wherein the fluid pressure pump 10 is driven to reduce pressure in the first accumulator 13.

According to the first aspect of the invention, the following effects can be obtained.

If locking of a wheel is detected at the time when the brake is applied, the anti-skid control unit produces a braking force while it operates. That is, the second directional control valve 8 is switched to the interrupting position b while the first directional control valve 38 is switched to the communication position f so that the operation fluid in the wheel cylinder 3 enters the first accumulator 13. When the fluid pressure pump 10 operates, the operation fluid in the first accumulator 13 is accumulated in the second accumulator 14. Further, the first directional control valve 38 is switched to the interrupting position g and the second directional control valve 8 is also switched to the interrupting position b so that the operation fluid in the wheel cylinder 3 remains at a given fluid pressure. When the first directional control valve 38 is switched to the interrupting position g while the second directional control valve 8 is switched to the communication position a so as to increase fluid pressure again owing to shortage of the braking force, the operation fluid accumulated in the second accumulator 14 when fluid pressure is reduced is supplied to the wheel cylinder 3 through the second directional control valve 8.

It is a second aspect of the invention to provide an anti-skid control unit for vehicles further comprising, in addition to the components of the first aspect of the invention, a third directional control valve 7 provided in the main fluid passage (4, 5 and 6) between the fluid pressure generating unit 1 and the pressure reduction fluid passage 9, and being switchable to a communication position d or to an interrupting position e, and a second check valve 7a disposed at the interrupting position e of the third directional control valve 7 for preventing operation fluid from flowing from the second accumulator 14 to the fluid pressure generating unit 1.

According to the second aspect of the invention, when the anti-skid control unit operates, the third directional control valve 7 is switched to the interrupting position e. As a result, the operation fluid is prevented from flowing from the second accumulator 14 to the fluid pressure generating unit 1 by the second check valve 7a so that kickback is prevented, and the operation fluid flowing out from the first accumulator 13 is accumulated in the second accumulator 14 when the fluid pressure pump 10 operates. Even if the first directional control valve 38 is switched to the interrupting position g and the second directional control valve 8 is switched to the communication position a so as to increase fluid pressure again, the third directional control valve 7 remains in the interrupting position e, whereby kick back does not occur.

In a state where the third directional control valve 7 having the second check valve 7a is switched to the interrupting position e, and the second directional control valve 8 is switched to the interrupting position b, when the brake pedal 32 is depressed strong, and fluid pressure of the operation fluid from the fluid pressure-generating unit exceeds that of the operation fluid inside the second accumulator 14, the operation fluid flows through the second check valve 7a of the third directional control valve 7, and is accumulated in the second accumulator 14. As a result, the brake pedal 32 can be on the further stroke, namely, can be further depressed so as to avoid the inferior operation feeling.

It is a third aspect of the invention to provide an anti-skid control unit for vehicles further comprising, in addition to the components of the second aspect of the invention, a circuit 15 which bypasses the third directional control valve 7, the circuit 15 having a relief valve 16 for allowing operation fluid in the second accumulator 14 to flow to the fluid pressure generating unit 1 when the operation fluid exceeds a given fluid pressure.

According to the third aspect of the invention, since the operation fluid in the second accumulator 14 flows from the relief valve 16 of the circuit 15 to the fluid pressure generating unit 1 when fluid pressure of the operation fluid exceeds a given fluid pressure, the second accumulator 14 is prevented from being damaged when high pressure acts upon the second accumulator 14.

It is a fourth aspect of the invention to provide an anti-skid control unit for vehicles further comprising, in addition to the components of the second or third aspect of the invention, a return circuit 40 which bypasses around the second directional control valve 8 and the third directional control valve 7, the return circuit 40 having a first check valve 39 for allowing the operation fluid to flow from the wheel cylinder 3 to the fluid pressure generating unit 1.

According to the fourth aspect of the invention, the operation fluid from the wheel cylinder 3 passes through the first check valve 39 of the return circuit 40, and is quickly returned to the fluid pressure generating unit 1, thereby bypassing the second directional control valve 8 and the third directional control valve 7.

PREFERRED EMBODIMENT OF THE INVENTION

Figure 1:
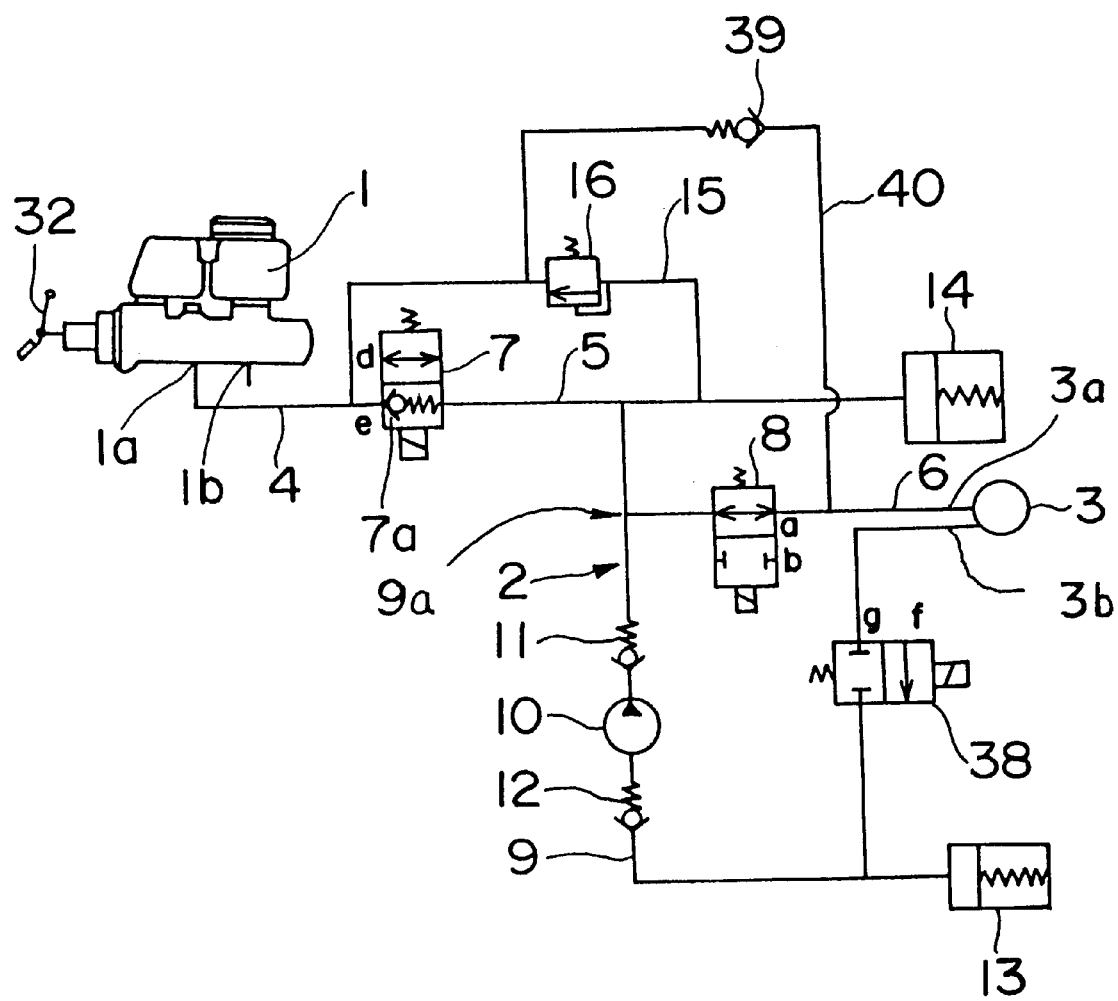
FIG. 1 is a schematic view showing an anti-skid control unit for vehicles according to a preferred embodiment of the invention.

An anti-skid control unit for vehicles according to a preferred embodiment of the present invention will be now described with reference to FIG. 1.

A fluid pressure generating unit 1 is a tandem master cylinder. When a brake pedal 32 is depressed, operation fluid is supplied from a pair of fluid supply ports 1a and 1b to be used for braking operation. The fluid supply port 1a is coupled to a wheel cylinder 3 by way of an actuator 2 of the anti-skid control unit. The wheel cylinder 3 is a cylinder of a disk-brake or a drum brake serving as the braking element of a vehicle. A first fluid passage 4, a second fluid passage 5 and a third fluid passage 6 constitute a main fluid passage wherein a third directional control valve 7 and second directional control valve 8 are provided in the main fluid passage and connected in series with each other. The second directional control valve 8 is by way of the third fluid passage 6 coupled to a first fluid port 3a of wheel cylinder 3 at one end thereof, and it can be switched to a pressure increasing position a serving as a communication position or to a pressure keeping/pressure reducing position b serving as an interrupting position. The second directional control valve 8 is normally switched to or positioned at the pressure increasing position a.

The third directional control valve 7 is by way of the first fluid passage 4 coupled to the fluid pressure generating unit 1 at the other end thereof. The third directional control valve 7 is normally switched to or positioned at a communication position d but is switchable to an interrupting position e. That is, while the anti-skid control unit operates when skids occur in a wheel, the third directional control valve 7 is switched from the communication position d to the interrupting position e so as to prevent the operation fluid from returning to the fluid pressure generating unit 1. As a result, the operation fluid is prevented from flowing from the wheel cylinder 3, particularly, from a second accumulator 14 so as to prevent the occurrence of kickback. Accordingly, a second check valve 7a is disposed at the interrupting position e of the third directional control valve 7 so as to prevent the operation fluid from flowing from the second accumulator 14 to the fluid pressure generating unit 1. Strictly speaking, the second accumulator 14 is coupled to the second fluid passage 5 between a part thereof to which a pressure reduction fluid passage 9 (described later) is coupled and the third directional control valve 7. The second accumulator 14 is generally coupled to the other end of the pressure reduction fluid passage 9.

Third and fourth check valves 11 and 12 are coupled to both sides of a fluid pressure pump 10 which is driven by a motor, not shown, in the pressure reduction fluid passage 9. The other end of the third check valve 11 is coupled to the second fluid passage 5 at the connecting point 9a. One end of the fourth check valve 12 is coupled to a first accumulator 13 and also coupled to the wheel cylinder 3 by way of a first directional control valve 38, which can be switched to a communication position f or an interrupting position g. The first directional control valve 38 of the pressure reduction fluid passage 9 is coupled to a second fluid port 3b of the wheel cylinder 3 and bypasses the second directional control valve 8, and is normally switched to or positioned at the interrupting position g. The third and fourth check valves 11 and 12 allow operation fluid to flow from the wheel cylinder 3 (first accumulator 13) to the master cylinder 1 (second accumulator 14).

A return circuit 40 is provided between the first fluid passage 4 and the third fluid passage 6 by way of a first check valve 39 bypassing the second directional control valve 8 and the third directional control valve 7 for allowing operation fluid to flow from the wheel cylinder 3 to the master cylinder 1. A relief valve 16 provided in a passage 15 has a function to flow operation fluid in the second accumulator 14 to the master cylinder 1 when operation fluid exceeds a given fluid pressure so as to prevent the second accumulator 14 from being damaged when high pressure acts on the second accumulator 14. When the fluid pressure pump 10 is driven, fluid pressure inside the first accumulator 13, through which the operation fluid from the wheel cylinder 3 enters, can be reduced.

The operation of the anti-skid control unit for a vehicles will be now described.

If locking of the wheel is detected by a wheel rotary sensor, not shown, when the brake pedal 32 is depressed and the brake is applied, a computer, not shown, issues an instruction upon reception of a detection signal from the wheel rotary sensor so as to operate the anti-skid control unit to produce braking force. That is, when the third directional control valve 7 is switched to the interrupting position e while the first directional control valve 38 is switched to the communication position f, and the second directional control valve 8 is switched to the pressure keeping/pressure reducing position b, operation fluid in the wheel cylinder 3 enters the first accumulator 13 so that the pressure in the wheel cylinder 3 is reduced. When the fluid pressure pump 10 operates, the operation fluid enters the second accumulator 14. In such a manner, the operation fluid from the wheel cylinder 3 is accumulated in the first and second accumulators 13 and 14. Further, when the first directional control valve 38 is switched to the interrupting position g, the second directional control valve 8 is switched to the pressure keeping/pressure reducing position b, the operation fluid in the wheel cylinder 3 remains at a given fluid pressure. Even if the second directional control valve 8 is switched to the pressure keeping/pressure reducing position b, the operation fluid from the master cylinder 1 passes through the second check valve 7a of the third directional control valve 7 which is switched to the interrupting position e, and is supplied to the second accumulator 14.

When the first directional control valve 38 is switched to the interrupting position g while the second directional control valve 8 is switched to the pressure increasing position a so as to increase fluid pressure again owing to shortage of the braking force, the operation fluid accumulated in the second accumulator 14 when fluid pressure is reduced is supplied to the wheel cylinder 3 through the second directional control valve 8. Even if the first directional control valve 38 is switched to the interrupting position g and the second directional control valve 8 is switched to the pressure increasing position a so as to increase fluid pressure again, the third directional control valve 7 remains in the interrupting position e so that the kick back does not occur.

When the brake pedal is depressed strong in a state where the third directional control valve 7 having the second check valve 7a is positioned in the interrupting position e so that fluid pressure in the first fluid passage 4 exceeds that in the second fluid passage 5, the operation fluid passes through the second check valve 7a of the third directional control valve 7, and is then accumulated in the second accumulator 14, so that the brake pedal 32 can be on the further stroke, namely, can be further depressed to avoid the inferior operating feeling (feeling as if a driver treaded on a stone).

As mentioned in detail above, since the anti-skid control unit for vehicles of the present invention, the first and second directional control valves, which operate when the skid occurs in the wheel, are constituted by the directional control valve having two switching positions, namely, which is always switched to the communication position or the interrupting position, these directional control valves are simplified in structure and is improved in switching speed compared with that having three directional positions, which enhances the control speed of the anti-skid control unit for vehicles. Further, when the anti-skid control unit for vehicles operates, the operation fluid in the wheel cylinder flows through the first directional control valve, fluid pressure pump, and the second directional control valve successively to thereby circulate, thus the wheel cylinder is cooled by the operation fluid. As a result, vapor lock can be restrained.

What is claimed is:

1. A hydraulic braking system for normal and anti-skid braking in a vehicle, comprising:

a braking element actuatable to brake a wheel of a vehicle, said braking element having first and second ports;

a fluid pressure generating unit producing fluid pressure for actuation of said braking element;

a main fluid passage connecting said first port to said fluid pressure generating unit, said main fluid passage delivering fluid to and from said first port during normal braking;

a pressure relief passage connecting said second port to a connecting point on said main fluid passage, said pressure relief passage removing fluid from said second port during anti-skid braking;

a main valve positioned in said main fluid passage between said connecting point and said first port, said main valve having bidirectional fluid flow position and an interrupting position, said main valve being in said bidirectional fluid flow position for normal braking and for supplying pressurized fluid during actuation of said braking element in anti-skid braking, said main valve being in said interrupting position for preventing fluid flow from said first port during pressure reduction in said braking element in anti-skid braking;

a pressure relief valve positioned in said pressure relief passage between said connecting point and said second port, said pressure relief valve having an interrupting position and an unidirectional fluid flow position, said pressure relief valve being in said interrupting position during normal braking for preventing fluid flow through said pressure relief passage, said pressure relief valve being in said interrupting position for preventing escape of pressurized fluid from said braking element during actuation of said braking element in anti-skid braking, said pressure relief valve being in said unidirectional fluid flow position during pressure reduction in said brake element in anti-skid braking;

a first accumulator, a fluid pressure pump and a second accumulator successively positioned from an end of said pressure relief valve remote from said braking element, wherein said fluid pressure pump is driven to reduce pressure in said first accumulator; and whereby during normal braking brake fluid flows into and out of said first port through both said main passage and main valve, and during anti-skid operation brake fluid flows into said first port through said main passage and main valve during pressure build up and out of said second port through said pressure relief valve and pressure relief passage during pressure relief so that brake fluid circulates during anti-skid operation.

2. The hydraulic anti-skid braking system for a vehicle according to claim 1, further comprising a third directional control valve provided in said main fluid passage between said fluid pressure generating unit and said connecting point, and being switchable to a communication position or to an interrupting position; and a check valve disposed at said interrupting position of said third directional control valve for preventing operation fluid from flowing from said second accumulator to said fluid pressure generating unit.

3. The hydraulic anti-skid braking system for a vehicle according to claim 2, further comprising a circuit for bypassing said third directional control valve, said circuit having a relief valve for allowing operation fluid in said second accumulator to flow to said fluid pressure generating unit when said operation fluid exceeds a given fluid pressure.

4. The hydraulic anti-skid braking system for a vehicle according to claim 2, further comprising a return circuit for bypassing said main valve and said third directional control valve, said return circuit having a second check valve for allowing said operation fluid to flow from said braking element to said fluid pressure generating unit.

5. A hydraulic braking system for normal and anti-skid braking in a vehicle, anti-skid braking having a pressure build-up brake actuation and a pressure relief operation, comprising:

a braking element actuatable for engaging a wheel of a vehicle, said braking element having first and second ports;

a fluid pressure generating unit producing fluid pressure for actuation of said braking element;

a main fluid passage connecting said first port to said fluid pressure generating unit, said main fluid passage delivering fluid to and from said first port during normal braking;

a pressure relief passage connecting said second port to a connecting point on said main fluid passage, said pressure relief passage removing fluid from said second port during anti-skid braking;

a main valve means for bidirectionally supplying fluid to said first port during normal braking and for supplying fluid to said first port during anti-skid actuation of said braking element and for interrupting fluid flow during anti-skid fluid pressure relief, said main valve means being positioned in said main fluid passage;

a secondary valve means for blocking fluid from escaping through said second port during normal braking and during anti-skid actuation of said braking element and for unidirectionally flowing fluid from said second port during anti-skid fluid pressure relief, said secondary valve means being positioned in said pressure relief passage;

a first accumulator, a fluid pressure pump and a second accumulator successively positioned from an end of said secondary valve means remote from said braking element, wherein said fluid pressure pump is driven to reduce pressure in said first accumulator.

6. The hydraulic anti-skid braking system according to claim 5, wherein said first accumulator is positioned in said pressure relief passage between said secondary valve means and said fluid pump; and said second accumulator is positioned in said main fluid passage between said fluid pressure generating unit and said connecting point.

7. The hydraulic anti-skid braking system according to claim 6, further comprising a third directional control valve provided in said main fluid passage between said fluid pressure generating unit and said second accumulator, and being switchable between a communication position and an interrupting position; and a check valve disposed at said interrupting position of said third directional control valve for preventing operation fluid from flowing from said second accumulator to said fluid pressure generating unit.

8. The hydraulic anti-skid braking system according to claim 7, further comprising a circuit for bypassing said third directional control valve, said circuit having a relief valve for allowing operation fluid in said second accumulator to flow to said fluid pressure generating unit when said operation fluid exceeds a given fluid pressure.

9. The hydraulic anti-skid braking system according to claim 8, further comprising a return circuit for bypassing said main valve means and said third directional control valve, said return circuit having a second check valve for allowing said operation fluid to flow from said braking element to said fluid pressure generating unit.

10. The hydraulic anti-skid braking system according to claim 5, further comprising said second fluid accumulator being fluidly coupled to said main fluid passage and adapted to receive operational fluid from said fluid pump.

11. The hydraulic anti-skid braking system according to claim 10, further comprising a third directional control valve provided in said main fluid passage between said fluid pressure generating unit and said second fluid accumulator, said third directional control valve being switchable between a communication position and an interrupting position; and a check valve coupled to the interrupting position of said third directional control valve for preventing operation fluid from flowing from said second fluid accumulator to said fluid pressure generating unit.

12. The hydraulic anti-skid braking system according to claim 11, further comprising a circuit for bypassing said third directional control valve, said circuit having a relief valve for allowing operation fluid in said second fluid accumulator to flow to said fluid pressure generating unit when said operation fluid exceeds a given fluid pressure.

13. The hydraulic anti-skid braking system according to claim 12, further comprising a return circuit for bypassing said main valve means and said third directional control valve, said return circuit having a second check valve for allowing said operation fluid to flow from said braking element to said fluid pressure generating unit.

14. A hydraulic vehicle braking system for normal and anti-skid braking, anti-skid braking having a brake actuation part and a pressure relief part, comprising:

a braking element being actuatable to engage a wheel of a vehicle, said braking element having first and second ports;

a fluid pressure generating unit producing fluid pressure for actuation of said braking element;

a main fluid passage connecting said first port to said fluid pressure generating unit, said main fluid passage delivering fluid to and from said first port during normal braking;

a pressure relief passage connecting said second port to a connecting point on said main fluid passage, said pressure relief passage removing fluid from said second port during anti-skid braking; and control means for controlling fluid flow and operation of said braking element, said control means including means for bidirectionally supplying fluid only to said first port during normal braking, means for blocking fluid flow from said second port during normal braking, first anti-skid means for supplying fluid to said first port during anti-skid actuation of said braking element, and second anti-skid means for blocking fluid flow from said first port and for unidirectionally flowing fluid from said second port during pressure relief of said braking element so that fluid circulates during anti-skid operation to prevent vapor lock.

* * * * *